(12) United States Patent
Nukaga

(10) Patent No.: US 10,611,899 B2
(45) Date of Patent: Apr. 7, 2020

(54) RUBBER COMPOSITION AND TIRE

(71) Applicant: BRIDGESTONE CORPORATION, Tokyo (JP)

(72) Inventor: Hideyuki Nukaga, Hino (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 39 days.

(21) Appl. No.: 16/066,543

(22) PCT Filed: Jan. 19, 2017

(86) PCT No.: PCT/JP2017/001814
§ 371 (c)(1),
(2) Date: Jun. 27, 2018

(87) PCT Pub. No.: WO2017/126633
PCT Pub. Date: Jul. 27, 2017

(65) Prior Publication Data
US 2019/0010312 A1  Jan. 10, 2019

(30) Foreign Application Priority Data

Jan. 19, 2016  (JP) ................................ 2016-008208

(51) Int. Cl.
| | |
|---|---|
| C08L 9/00 | (2006.01) |
| C08L 7/00 | (2006.01) |
| C08L 15/00 | (2006.01) |
| B60C 1/00 | (2006.01) |
| B60C 11/00 | (2006.01) |
| C08K 9/04 | (2006.01) |

(52) U.S. Cl.
CPC ...... *C08L 9/00* (2013.01); *B60C 1/00* (2013.01); *B60C 1/0016* (2013.01); *B60C 11/0008* (2013.01); *C08L 7/00* (2013.01); *C08L 15/00* (2013.01); *C08K 9/04* (2013.01)

(58) Field of Classification Search
CPC ..... B60C 1/00; B60C 1/0016; B60C 11/0008; C08L 7/00; C08L 9/00; C08L 15/00; C08L 57/02; C08K 3/04; C08K 3/36; C08K 5/548; C08K 7/02
See application file for complete search history.

(56) References Cited

U.S. PATENT DOCUMENTS

| | | |
|---|---|---|
| 2001/0051684 A1 | 12/2001 | Luginsland et al. |
| 2003/0036599 A1 | 2/2003 | Mori et al. |
| 2009/0308517 A1 | 12/2009 | Nohara et al. |
| 2014/0296373 A1 | 10/2014 | Mabuchi et al. |
| 2014/0296421 A1* | 10/2014 | Miyazaki ............ B60C 1/0016 524/526 |

FOREIGN PATENT DOCUMENTS

| | | |
|---|---|---|
| CN | 1842569 A | 10/2006 |
| CN | 101516646 A | 8/2009 |
| CN | 103059357 A | 4/2013 |
| CN | 104072825 A | 10/2014 |
| EA | 201070798 A1 | 2/2011 |
| EP | 2 193 938 A1 | 6/2010 |
| EP | 2 223 959 A1 | 9/2010 |
| JP | 2-135241 A | 5/1990 |
| JP | 07-133376 A | 5/1995 |
| JP | 11-189616 A | 7/1999 |
| JP | 2001-158836 A | 6/2001 |
| JP | 2001-279028 A | 10/2001 |
| JP | 2004-066894 A | 3/2004 |
| JP | 2004-238619 A | 8/2004 |
| JP | 2005-105060 A | 4/2005 |
| JP | 2008-138086 A | 6/2008 |
| JP | 2008-303334 A | 12/2008 |
| JP | 2011-088988 A | 5/2011 |
| JP | 2011-089066 A | 5/2011 |
| JP | 2012-136581 A | 7/2012 |
| JP | 2013-035902 A | 2/2013 |
| JP | 2015-078272 A | 4/2015 |
| RU | 2279988 C2 | 7/2006 |
| WO | 2011/052027 A1 | 12/1918 |
| WO | 2009/158604 A2 | 12/2009 |
| WO | 2012/147891 A1 | 11/2012 |

OTHER PUBLICATIONS

International Search Report for PCT/JP2017/001814, dated Apr. 25, 2017.
Search Report dated Apr. 25, 2019 issued by the Russian Patent Office in counterpart Application No. 2018129909/05.
Database WPI Week 201132, Thomson Scientific, London, GB; AN 2011-E76998, XP002785820, May 6, 2011, 3 pages total.
Database WPI Week 201132, Thomson Scientific, London, GB; AN 2011-E79255, XP002786821, May 5, 2011, 2 pages total.
Extended European Search Report dated Dec. 7, 2018 issued by the European Patent Office in counterpart European application No. 17741510.6.
Search Report dated Jan. 13, 2019 by the China National Intellectual Property Administration in application No. 201780007297.6.

* cited by examiner

*Primary Examiner* — Nathan M Nutter
(74) *Attorney, Agent, or Firm* — Sughrue Mion, PLLC

(57) ABSTRACT

A rubber composition, capable of improving both on-ice performance and wear resistance of a tire, contains at least one type of diene polymer, silica, and a resin, wherein: 5 MP≤storage elastic modulus (E') of the rubber composition at $-20°$ C.≤10 MPa; storage elastic modulus (E') at $-20°$ C. and loss tangent (tan δ) at $-20°$ C. of the rubber composition satisfy formula (1) below; and a mass ratio of content (parts by mass) of the silica with respect to content (parts by mass) of the resin, or silica content/resin content, is in the range of 1.00 to 4.00.

$$0.02 \times (E'_{-20° C.}) + 0.25 \leq (\tan \delta_{-20° C.}) \leq 0.65 \quad (1)$$

In the formula, ($E'_{-20° C.}$) represents storage elastic modulus (MPa) of the rubber composition at $-20°$ C. and (tan $\delta_{-20° C.}$) represents loss tangent of the rubber composition at $-20°$ C.

21 Claims, No Drawings

RUBBER COMPOSITION AND TIRE

This application is a National Stage of International Application No. PCT/JP2017/001814 filed Jan. 19, 2017, claiming priority based on Japanese Patent Application No. 2016-008208 filed Jan. 19, 2016.

TECHNICAL FIELD

The present invention relates to a rubber composition and a tire.

BACKGROUND

There has been conventionally used a studless tire having relatively soft tread rubber as a tire for safely running on ice, as well as a dry road surface. It is known that on-ice performance of a tire improves when tread rubber of the tire is made relatively soft. However, a tire having soft tread rubber generally has a problem in that the tire exhibits poor wear resistance on a dry road surface. In short, on-ice performance and wear resistance of a tire cannot be improved at the same time in a compatible manner.

In this connection, PTL1 proposes a rubber composition containing 0.5-20 parts by weight of potassium titanate fiber and 5-200 parts by weight of carbon black having 100-300 mg/g of iodine adsorption amount, with respect to 100 parts by weight of a rubber component comprising natural rubber and butadiene rubber. PTL1 reports that use of the rubber composition in a cap tread layer of two-layered tread including cap tread and base tread improves performance on ice (and snow), while well suppressing deterioration of wear resistance of the tire.

CITATION LIST

Patent Literature

PTL 1: JP 2008-303334 A

SUMMARY

Technical Problem

However, as is disclosed in Table 1 of PTL1, use of the rubber composition containing potassium titanate fiber by a specific range of content in cap tread of a tire improves on-ice performance (on-ice friction coefficient) but slightly deteriorates wear resistance of the tire, thereby failing to improve both on-ice performance and wear resistance of the tire.

In view of this, an object of the present disclosure is to provide a rubber composition capable of solving the prior art problems described above and significantly improving both on-ice performance and wear resistance of a tire.

Further, another object of the present disclosure is to provide a tire being excellent in both on-ice performance and wear resistance.

Solution to Problem

Primary features of the present disclosure for solving the prior art problems are as follows.

A rubber composition of the present disclosure includes at least one type of diene polymer, silica, and a resin, wherein:

5 MPa≤storage elastic modulus (E') of the rubber composition at −20° C.≤10 MPa;

storage elastic modulus (E') at −20° C. and loss tangent (tan δ) at −20° C. of the rubber composition satisfy following formula (1):

$$0.02 \times (E'_{-20°C.}) + 0.25 \leq (\tan \delta_{-20°C.}) \leq 0.65 \quad (1)$$

(In the formula, ($E'_{-20°C.}$) represents storage elastic modulus (MPa) of the rubber composition at −20° C. and (tan $\delta_{-20°C.}$) represents loss tangent of the rubber composition at −20° C.); and a mass ratio of content (parts by mass) of the silica with respect to content (parts by mass) of the resin, or (silica content/resin content), is in the range of 1.00 to 4.00.

According to the rubber composition of the present disclosure, it is possible to improve both on-ice performance and wear resistance of a tire by applying the rubber composition to the tire.

It is preferable in the rubber composition of the present disclosure that at least one of the diene polymers has a modified terminal. Low fuel consumption property, as well as on-ice performance, of a tire improves in this case when the rubber composition is applied to the tire.

It is preferable in the rubber composition of the present disclosure that the silica has a content of ≥20 parts by mass with respect to the total mass or 100 parts by mass of the diene polymers and the rubber composition further includes carbon black by a content of ≥20 parts by mass with respect to the total mass or 100 parts by mass of the diene polymers. On-ice performance and wear resistance of a tire further improve in this case when the rubber composition is applied to the tire.

In this connection, the total content of the silica and the carbon black is preferably ≥60 parts by mass with respect to the total mass or 100 parts by mass of the diene polymers. On-ice performance and wear resistance of a tire even further improve in this case when the rubber composition is applied to the tire.

The content of the silica is preferably equal to or higher than the content of the carbon black. Further improvement of on-ice performance, as well as further improvement of low fuel consumption property, of a tire can be achieved in this case when the rubber composition is applied to the tire.

It is preferable in the rubber composition of the present disclosure that: the diene polymer includes at least two types of diene polymers forming a plurality of polymer phases which are immiscible with each other; and in the diene polymer having the highest content and the diene polymer having the second highest content, of the polymers, content of the diene polymer (A) having lower glass transition temperature (Tg) is ≥80 mass % of content of the diene polymer (B) having higher glass transition temperature (Tg). It is possible to ensure satisfactory softness of the rubber composition and thus achieve further improvement of on-ice performance in this case.

Immiscibility of the polymer phases is evaluated in the present disclosure by: processing a rubber composition to be examined into a sheet-like configuration by using a roll for the test; subjecting the sheet to pressure vulcanization by using a mold (15 cm×15 cm×1 cm) for the test at 150° C. for 30 minutes, to prepare a vulcanized rubber sheet; cutting the vulcanized rubber sheet by a microtome, thereby obtaining an ultrathin slice of the vulcanized rubber sheet; and observing the slice thus obtained by using a scanning probe microscope. The polymer phases are judged to be immiscible with each other when a phase-separated structure is confirmed in the slice.

Glass transition temperature (Tg) of the diene polymer in the present disclosure is represented by extrapolated onset temperature (Tf) measured by using a differential scanning calorimeter (DSC) according to ASTM D3418-82.

It is preferable in the rubber composition of the present disclosure that the diene polymer (A) has a modified terminal. Low fuel consumption property, as well as on-ice performance and wear resistance, of a tire improves in this case when the rubber composition is applied to the tire.

It is preferable in the rubber composition of the present disclosure that a mass ratio of content (parts by mass) of the diene polymer (A) having a modified terminal with respect to content (parts by mass) of the resin, or (content of the diene polymer (A) having a modified terminal/content of the resin), is in the range of 1.2 to 7.5. On-ice performance and wear resistance of a tire further improve in this case when the rubber composition is applied to the tire.

Further, it is preferable in the rubber composition of the present disclosure that a mass ratio of content (parts by mass) of the silica with respect to content (parts by mass) of the resin, or (silica content/resin content), is in the range of 1.00 to 2.95. On-ice performance and wear resistance of a tire further improve in this case when the rubber composition is applied to the tire.

Yet further, in the rubber composition of the present disclosure, a ratio of the resin content (parts by mass) with respect to a foaming ratio (%) of the rubber composition, or [resin content (parts by mass)/foaming ratio (%) of the rubber composition], is preferably in the range of 0.4 to 4.0, more preferably in the range of 0.4 to 3.5, and further more preferably in the range of 0.4 to 2.0. On-ice performance and wear resistance of a tire further improve in this case when the rubber composition is applied to the tire.

Yet further, loss tangent (tan δ) at −20° C. of the rubber composition of the present disclosure is preferably ≥0.46 and ≤0.55. On-ice performance and wear resistance of a tire further improve in this case when the rubber composition is applied to the tire.

The diene polymer (A) preferably has a butadiene skeleton. The rubber composition is made relatively soft in this case, thereby increasing a ground-contact area of a tread and thus improving on-ice performance of a tire when the rubber composition is used in the tread of the tire.

In this connection, the diene polymer (A) is preferably polybutadiene rubber because then the rubber composition is made further soft, thereby further increasing a ground-contact area and thus further improving on-ice performance of the tire.

The diene polymer (B) preferably has an isoprene skeleton. The rubber composition exhibits better reinforcing properties and thus better wear resistance in this case.

In this connection, the diene polymer (B) is preferably natural rubber. The rubber composition exhibits even better reinforcing properties and thus even better wear resistance in this case.

Further, it is preferable that the diene polymer (A) has a terminal modified by a silane compound. On-ice performance of a tire further improves in this case when the rubber composition is applied to the tire.

In this connection, it is preferable that the silane compound has a glycidoxy group. On-ice performance of a tire even further improves in this case when the rubber composition is applied to the tire.

It is preferable that the rubber composition according to the present disclosure further contains a foaming agent. It is possible, by manufacturing a tire by using in tread rubber thereof the rubber composition containing a foaming agent, to form gas bubbles derived from the foaming agent in the tread rubber when a green tire is vulcanized, thereby further improving on-ice performance of the tire by a scratching effect and a drainage effect caused by the gas bubbles (-derived holes) in a tread.

It is preferable that the rubber composition according to the present disclosure has gas bubble-derived holes formed therein. It is possible, by using the rubber composition having gas bubble-derived holes therein in tread rubber of a tire, to further improve on-ice performance of the tire by a scratching effect and a drainage effect caused by the gas bubble-derived holes in a tread of the tire.

It is preferable that the rubber composition according to the present disclosure contains a $C_5$ resin as the resin. On-ice performance of a tire can be further improved by this arrangement.

It is preferable that the rubber composition according to the present disclosure further contains hydrophilic short fibers. On-ice performance of a tire can be highly improved by this arrangement.

Further, a tire of the present disclosure is characterized in that it uses the rubber composition described above. The tire according to the present disclosure is excellent in both on-ice performance and wear resistance because it uses the rubber composition described above.

Advantageous Effect

According to the present disclosure, it is possible to provide a rubber composition capable of significantly improving both on-ice performance and wear resistance of a tire.

Further, according to the present disclosure, it is possible to provide a tire being excellent in both on-ice performance and wear resistance.

DETAILED DESCRIPTION

<Rubber Composition>

A rubber composition of the present disclosure will be demonstratively described in detail hereinafter by an embodiment thereof.

A rubber composition of the present disclosure includes at least one type of diene polymer, silica, and a resin, wherein:

5 MPa≤storage elastic modulus (E') of the rubber composition at −20° C.≤10 MPa;

storage elastic modulus (E') at −20° C. and loss tangent (tan δ) at −20° C. of the rubber composition satisfy following formula (1):

$$0.02 \times (E'_{-20° C.}) + 0.25 \leq (\tan \delta_{-20° C.}) \leq 0.65 \quad (1)$$

(In the formula, ($E'_{-20° C.}$) represents storage elastic modulus (MPa) of the rubber composition at −20° C. and (tan $\delta_{-20° C.}$) represents loss tangent of the rubber composition at −20° C.); and a mass ratio of content (parts by mass) of the silica with respect to content (parts by mass) of the resin, or (silica content/resin content), is in the range of 1.00 to 4.00.

A rubber composition having a low value of storage elastic modulus (E') at −20° C. is relatively soft even at low temperature, whereby contact property with an icy road surface, of a tire, improves when the rubber composition is applied to the tire. Further, a rubber composition having a high value of loss tangent (tan δ) at −20° C. exhibits relatively large hysteresis loss at low temperature, whereby shearing force of a tire in braking improves when the rubber composition is applied to the tire.

Setting storage elastic modulus (E') at −20° C. of the rubber composition of the present disclosure to be ≤10 MP improves contact property with an icy road surface, of a tire, and making storage elastic modulus (E') at −20° C. and loss tangent (tan δ) at −20° C. of the rubber composition satisfy the formula (1) enhances shearing force of the tire in braking, whereby on-ice performance of the tire satisfactorily improves.

Further, setting storage elastic modulus (E') at −20° C. of the rubber composition of the present disclosure to be ≥5 MP improves wear resistance of a tire when the rubber composition is applied to the tire.

Storage elastic modulus (E') at −20° C. of the rubber composition of the present disclosure is preferably ≤9.2 MPa in terms of achieving good on-ice performance and preferably ≥7 MPa, more preferably ≥7.8 MPa, in terms of achieving high wear resistance.

Further, loss tangent (tan δ) at −20° C. of the rubber composition of the present disclosure is preferably ≥0.46, more preferably ≥0.48, in terms of achieving good on-ice performance and preferably ≤0.59, more preferably ≤0.56, and further more preferably ≤0.55, in terms of achieving high wear resistance.

In a case where loss tangent (tan δ) at −20° C. of the rubber composition is set to be in the range of ≥0.46 and ≤0.55, on-ice performance and wear resistance of a tire significantly improve when the rubber composition is applied to a tread of the tire.

It is possible to manufacture the rubber composition in which 5 MP≤storage elastic modulus (E') at −20° C.≤10 MPa and storage elastic modulus (E') at −20° C. and loss tangent (tan δ) at −20° C. satisfy the relationship of following formula (1), by adjusting types and contents of the compounding agents to be blended such as the diene polymer(s) as a rubber component, silica, resin, and the like.

A preferable example of the compounding agents such as the diene polymer(s) as a rubber component, silica, resin, and the like, which can be used in manufacturing the rubber composition of the present disclosure, will be described hereinafter.

The rubber composition of the present disclosure contains at least one type of diene polymer and it is preferable that at least one (type) of the diene polymer(s) has a modified terminal. Use of the diene polymer having a modified terminal results in strong interaction between the rubber composition and fillers such as silica, thereby further improving on-ice performance and wear resistance of a tire when the rubber composition is applied to a tread of the tire.

The rubber composition of the present disclosure contains silica. The silica makes a polymer phase formed by the diene polymer(s) soft, while imparting the polymer phase with minute irregularities, thereby improving on-ice performance of a tire.

The silica has CTAB (cetyltrimethylammonium bromide) adsorption specific surface area, which is preferably ≥180 m$^2$/g, more preferably ≥190 m$^2$/g, further more preferably ≥195 m$^2$/g, most preferably ≥197 m$^2$/g, and preferably ≤600 m$^2$/g, more preferably ≤300 m$^2$/g, most preferably ≤250 m$^2$/g. The CTAB adsorption specific surface area ≥180 m$^2$/g further enhances wear resistance and the CTAB adsorption specific surface area ≤600 m$^2$/g makes rolling resistance satisfactorily small.

Type of the silica is not particularly restricted and examples thereof include wet-type silica (hydrated silica), dry-type silica (silicic anhydride), calcium silicate, aluminum silicate, and the like. Wet-type silica is preferable among these examples. These silicas may be used by either a single type solely or two or more types in combination.

Content of the silica is preferably ≥20 parts by mass, more preferably ≥25 parts by mass, further more preferably ≥30 parts by mass, most preferably ≥40 parts by mass, and preferably ≤80 parts by mass, more preferably ≤70 parts by mass, with respect to the total, i.e. 100 parts by mass, of the diene polymers. Setting the content of the silica to be ≥20 parts by mass with respect to the total or 100 parts by mass of the diene polymers further improves on-ice performance of a tire. Setting the content of the silica to be ≤80 parts by mass with respect to the total or 100 parts by mass of the diene polymers ensures good workability of the rubber composition.

It is preferable in the rubber composition of the present disclosure that the content of silica is equal to or larger than the content of carbon black described below. In a case where the content of silica is equal to or larger than the content of carbon black, further improvement of on-ice performance, as well as further improvement of low fuel consumption property, of a tire can be achieved when the rubber composition is applied to the tire.

It is preferable that the rubber composition of the present disclosure further contains carbon black. Carbon black reinforces the polymer phase(s) formed by the diene polymer(s), thereby enhancing wear resistance of a tire.

Type of the carbon black is not particularly restricted and examples thereof include carbon blacks of GPF, FEF, HAF, ISAF, SAF grades. These carbon blacks may be used by either a single type solely or two or more types in combination.

Content of the carbon black is preferably ≥20 parts by mass, more preferably ≥25 parts by mass, further more preferably ≥27 parts by mass, most preferably ≥29 parts by mass, and preferably ≤50 parts by mass, more preferably ≤40 parts by mass, with respect to the total, i.e. 100 parts by mass, of the diene polymers. Setting the content of the carbon black to be ≥20 parts by mass with respect to the total or 100 parts by mass of the diene polymers further improves wear resistance of a tire. Setting the content of the carbon black to be ≤50 parts by mass with respect to the total or 100 parts by mass of the diene polymers ensures good workability of the rubber composition.

It is preferable in the rubber composition of the present disclosure that content of the silica is ≥20 parts by mass and content of the carbon black is ≥20 parts by mass with respect to the total or 100 parts by mass of the diene polymers. The content of the silica ≥20 parts by mass further improves on-ice performance and the content of the carbon black ≥20 parts by mass further enhances wear resistance, whereby on-ice performance and wear resistance of a tire can be improved in a highly satisfactory manner when the rubber composition is applied to the tire.

The total content of the silica and the carbon black is preferably ≥60 parts by mass with respect to the total or 100 parts by mass of the diene polymers. On-ice performance and wear resistance of a tire further improve when the rubber composition having the total content of silica and carbon black therein ≥60 parts by mass with respect to the total or 100 parts by mass of the diene polymers is used in a tread of the tire.

The rubber composition of the present disclosure preferably contains at least two types of diene polymers forming a plurality of polymer phases which are immiscible with each other. In this connection, with respect to the diene polymer having the highest content and the diene polymer having the second highest content of these at least two types of diene polymers, content of the diene polymer (A) having lower glass transition temperature (Tg) is preferably ≥80 mass %, more preferably ≥90 mass %, further more preferably ≥100 mass %, also preferably ≤175 mass %, of content of the diene polymer (B) having higher glass transition temperature (Tg).

The polymer blend constituted of the at least two types of diene polymers forms a plurality of polymer phases which are immiscible with each other, as described above. The aforementioned diene polymer having the highest content of the at least two types of diene polymers constitutes the sea phase of a sea-island structure formed by the plurality of polymer phases which are immiscible with each other. On the other hand, the aforementioned diene polymer having the second highest content of the at least two types of diene polymers constitutes the island phase of the sea-island structure formed by the plurality of polymer phases which are immiscible with each other. With respect to these diene polymers having the highest and the second highest contents, the diene polymer (A) having lower glass transition temperature (Tg) is relatively soft and exhibits good on-ice performance. On the other hand, the diene polymer (B) having higher glass transition temperature (Tg) is relatively hard and exhibits high wear resistance.

In this regard, setting the content of the diene polymer (A) having lower glass transition temperature (Tg) to be ≥80 mass % of the content of the diene polymer (B) having higher glass transition temperature (Tg) ensures satisfactory softness of the rubber composition and thus further improves on-ice performance of a tire.

The diene polymers forming the polymer phases exhibit rubber elasticity at the room temperature (25° C.). Examples of the diene polymers include natural rubber (NR) and synthetic diene rubber. Specific examples of the synthetic diene rubber include polybutadiene rubber (BR), synthetic polyisoprene rubber (IR), styrene-butadiene copolymer rubber (SBR), styrene-isoprene copolymer rubber (SIR), and the like. Combination of "diene polymer having butadiene skeleton/diene polymer having isoprene skeleton" is preferable as a combination of the diene polymers forming a plurality of polymer phases which are immiscible with each other. Specific examples of the combination of "diene polymer having butadiene skeleton/diene polymer having isoprene skeleton" include polybutadiene rubber (BR)/natural rubber (NR), polybutadiene rubber (BR)/synthetic polyisoprene rubber (IR), and the like. Polybutadiene rubber (BR)/natural rubber (NR) is preferable among these examples.

The diene polymer (A) preferably has a modified terminal. The diene polymer (A) having a modified terminal exhibits strong interaction with fillers, thereby improving dispersibility of the fillers in the polymer phase including the diene polymer (A). As a result, improvement of low fuel consumption property, as well as further improvement of on-ice performance and wear resistance, of a tire can be achieved in this case when the rubber composition is applied to a tread of the tire.

The rubber composition of the present disclosure has loss tangent (tan δ) at 50° C. of preferably ≤0.18, more preferably ≤0.16. Setting loss tangent (tan δ) at 50° C. of the rubber composition to be ≤0.18 decreases rolling resistance and thus improves low fuel consumption property of a tire when the rubber composition is applied to the tire.

Storage elastic modulus (E') at −20° C. and loss tangent (tan δ) at −20° C. of the rubber composition of the present disclosure are made to satisfy the formula (1) in terms of improving on-ice performance of a tire, as described above. In general, an increase in loss tangent (tan δ) at −20° C. often results in an increase in loss tangent (tan δ) at 50° C., as well, thereby making it difficult to achieve good on-ice performance and good low fuel consumption property of a tire simultaneously in a compatible manner. However, in a case where the diene polymer (A) has a modified terminal, it is possible to decrease loss tangent (tan δ) at 50° C. of the rubber composition, while increasing loss tangent (tan δ) at −20° C. thereof, thereby successfully achieving good on-ice performance and good low fuel consumption property of a tire simultaneously in a compatible manner when the rubber composition is applied to the tire.

It is preferable in the rubber composition of the present disclosure that the diene polymer (A) has a terminal modified by a silane compound. In this connection, the silane compound preferably has a glycidoxy group.

The diene polymer (A) having a terminal modified by a silane compound exhibits strong interaction with silica, whereby a relatively large proportion of silica is distributed to a polymer phase including the diene polymer (A), so that the polymer phase is made soft and imparted with minute irregularities. Accordingly, when this rubber composition is used in a tread of a tire, a relatively large ground contact area of the tread is obtained, which improves on-ice performance of the tire. On the other hand, a relatively large proportion of carbon black is distributed to a polymer phase not including the diene polymer (A), i.e. a polymer phase formed by the diene polymer other than the diene polymer (A), because a relatively large proportion of silica is distributed to a polymer phase including the diene polymer (A). The polymer phase not including the diene polymer (A) exhibits improved wear resistance because the polymer phase contains a relatively large amount of carbon black which inherently has good reinforcing properties.

Further, the diene polymer (A) having a terminal modified by a silane compound having a glycidoxy group exhibits stronger interaction with silica than other modifications, thereby further improving dispersibility of the silica in the polymer phase including the diene polymer and thus yet further improving on-ice performance of a tire can when the rubber composition is applied to the tire.

Examples of the diene polymer (A) having the lower glass transition temperature (Tg) (which diene polymer (A) will occasionally be referred to as the "low Tg diene polymer (A)" hereinafter), which may be used, include: polymer or copolymer of a conjugated diene compound, obtained by using the conjugated diene compound as monomers; copolymer of a diene compound and an aromatic vinyl compound, obtained by using the conjugated diene compound and the aromatic vinyl compound as monomers; and those obtained by modifying molecular terminals and/or main chains of these (co)polymers. Specific examples of the known modified diene polymer having a modified molecular terminal include the modified diene polymers disclosed in WO 2003/046020 A, JP 2004-513987 A, JP H11-29603 A, JP 2003-113202 A, and JP H06-029338 B. Specific examples of the known modified diene polymer having a modified molecular main chain include the modified diene polymers disclosed in JP 2003-534426 A and JP 2002-201310 A.

In respect of the monomers for use in synthesis of the low Tg diene polymer (A), examples of the conjugated diene compound include 1,3-butadiene, isoprene, 1,3-pentadiene, 2,3-dimethylbutadiene, 2-phenyl-1,3-butadiene, 1,3-hexadiene, and the like and examples of the aromatic vinyl compound include styrene, α-methylstyrene, 1-vinylnaphthalene, 3-vinyltoluene, ethylvinylbenzene, divinylbenzene, 4-cyclohexylstyrene, 2,4,6-trimethylstyrene, and the like.

The low Tg diene polymer (A) having a modified molecular terminal can be manufactured by, for example, reacting a terminal of a diene polymer (the diene polymer has an active terminal) with a modification agent of various types according to the method disclosed in WO 2003/046020 A or JP 2007-217562 A.

In a preferred embodiment, the low Tg diene polymer (A) having a modified molecular terminal can be manufactured by reacting a terminal of a diene polymer (the diene polymer has an active terminal of which cis-1,4 bond content is ≥75%) with a silane compound (e.g. a hydrocarbyloxysilane compound) and then with a carboxylic acid partial ester of polyhydric alcohol for stabilization according to the method disclosed in WO 2003/046020 A or JP 2007-217562 A.

When a molecular terminal of a diene polymer is modified by a silane compound (a modification agent), it is preferable to use a silane compound having a glycidoxy group as the silane compound as described above. Specific examples of the silane compound having a glycidoxy group include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, and the like. 3-glycidoxypropyltrimethoxysilane and 3-glycidoxypropyltriethoxysilane are particularly preferable among these examples.

The aforementioned "carboxylic acid partial ester of polyhydric alcohol" represents an ester of a polyhydric alcohol and a carboxylic acid, which is specifically a partial ester having at least one hydroxyl group. More specifically, examples of the carboxylic acid partial ester of polyhydric alcohol, which can be preferably used, include an ester of a fatty aid and a saccharide/a modified saccharide having four or more carbon atoms, and more preferable examples of the partial ester include: (1) a fatty acid partial ester of a polyhydric alcohol, in particular a partial ester (any of monoester, diester, trimester will do) of a saturated $C_{10-20}$ higher fatty acid/an unsaturated $C_{10-20}$ higher fatty acid and a polyhydric acid; (2) an ester compound obtained by bonding 1 to 3 partial ester(s) of a polyhydric alcohol and a higher alcohol to a polyhydric alcohol; and the like.

Examples of a polyhydric alcohol used as a raw material of the aforementioned partial ester include: a $C_5/C_6$ saccharide (which may be either hydrogenated or not hydrogenated) preferably having at least three hydroxyl groups; a glycol compound; a polyhydroxy compound; and the like. A fatty acid as a raw material of the aforementioned partial ester is preferably a saturated/unsaturated $C_{10-20}$ fatty acid and examples thereof include stearic acid, lauric acid, and palmitic acid.

The aforementioned fatty acid partial ester of a polyhydric alcohol is preferably sorbitan fatty acid ester and specific examples thereof include sorbitan monolauric acid ester, sorbitan monopalmitic acid ester, sorbitan monostearic acid ester, sorbitan tristearic acid ester, sorbitan monooleic acid ester, sorbitan trioleic acid ester, and the like.

The low Tg diene polymer (A) having a modified main chain can be manufactured, for example, by: (1) a method for graft-polymerizing a polar group-containing monomer on (co)polymer of the aforementioned monomer; (2) a method for copolymerizing the aforementioned monomer and a polar group-containing monomer; and (3) a method for adding a polar group-containing compound to (co)polymer of the aforementioned monomer. The copolymerization by using a polar group-containing monomer may be carried out by any of emulsion polymerization, living anionic polymerization and living radical polymerization. Copolymer of the aforementioned monomer and a polar group-containing monomer may be obtained by block polymerization of a polar group-containing monomer and a monomer selected from a conjugated diene compound and an aromatic vinyl compound.

In (1) the method for graft-polymerizing a polar group-containing monomer on (co)polymer of a conjugated diene compound and an aromatic vinyl compound and (2) the method for copolymerizing a conjugated diene compound, an aromatic vinyl compound or the like with a polar group-containing monomer described above, the polar group-containing monomer for use is preferably a vinyl monomer having a polar group. In (3) the method for adding a polar group-containing compound to (co)polymer of a conjugated diene compound, an aromatic vinyl compound or the like, the polar group-containing compound for use is preferably a mercapto compound having a polar group. Specific examples of the polar group include alkoxysilyl group, and the like.

Specific examples of the vinyl monomer having a polar group include (meth)acryloxymethyltrimethoxysilane ("(meth)acryloxy" represents "acryloxy and/or methacryloxy" in the present disclosure), (meth)acryloxymethylmethyldimethoxysilane, (meth)acryloxymethyldimethylmethoxysilane, (meth)acryloxymethyltriethoxysilane, (meth)acryloxymethylmethyldiethoxysilane, (meth)acryloxymethyldimethylethoxysilane, (meth)acryloxymethyltripropoxysilane, (meth)acryloxymethylmethyldipropoxysilane, (meth)acryloxymethyldimethylpropoxysilane, γ-(meth)acryloxyproplyltrimethoxysilane, γ-(meth)acryloxyproplylmethyldimethoxysilane, γ-(meth)acryloxyproplyldimethylmethoxysilane, γ-(meth)acryloxyproplyltriethoxysilane, γ-(meth)acryloxyproplylmethyldiethoxysilane, γ-(meth)acryloxyproplyldimethylethoxysilane, γ-(meth)acryloxyproplyltripropoxysilane, γ-(meth)acryloxyproplylmethyldipropoxysilane, γ-(meth)acryloxyproplyldimethylpropoxysilane, γ-(meth)acryloxyproplylmethyldiphenoxysilane, γ-(meth)acryloxyproplyldimethylphenoxysilane, γ-(meth)acryloxyproplylmethyldibenzyloxysilane, γ-(meth)acryloxyproplyldimethylbenzyloxysilane, trimethoxyvinylsilane, triethoxyvinylsilane, 6-trimethoxysilyl-1,2-hexene, p-(trimethoxysilyl)styrene, and the like. These monomers may be used by either a single type solely or two or more types in combination.

Specific examples of the mercapto compound having a polar group include (3-mercaptopropyl)trimethoxysilane, (3-mercaptopropyl)triethoxysilane, (3-mercaptopropyl)methyldimethoxysilane, (3-mercaptopropyl)dimethylmethoxysilane, (2-mercaptoethyl)trimethoxysilane, (2-mercaptoethyl)triethoxysilane, mercaptomethylmethyldiethoxysilane, mercaptomethyltrimethoxysilane, and the like. These mercapto compounds may be used by either a single type solely or two or more types in combination.

It is preferable that a terminal of the diene polymer (A) has been modified by a compound containing at least one of tin atom (Sn) and nitrogen atom (N). Modifying the diene polymer (A) by a compound containing at least one of tin atom and nitrogen atom further enhances interaction between the diene polymer (A) and carbon black, thereby further improving dispersibility of carbon black into the polymer phase including the diene polymer (A) and thus further improving wear resistance of the rubber composition.

The diene polymer (A) having a molecular terminal modified by a compound containing at least one of tin atom (Sn) and nitrogen atom (N) can be manufactured, for example, by subjecting the aforementioned monomers to living polymerization using a polymerization initiator containing tin atom and/or nitrogen atom and then modifying an active polymerization terminal by a modification agent containing tin atom and/or nitrogen atom. The living polymerization is preferably anionic polymerization.

In a case where (co)polymer having an active terminal is manufactured by anionic polymerization, a lithium amide compound is preferable as the polymerization initiator. Example of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dipropylamide, lithium dibutylamide, lithium dihexylamide, lithium diheptylamide, lithium dioctylamide, lithium bis(2-ethtylhexyl)amide, lithium didecyl amide, lithium N-methylpiperazide, lithium ethylpropylamide, lithium ethylbutylamide, lithium methylbutylamide, lithium ethylbenzylamide, lithium methylphenetylamide, and the like.

Use of a lithium amide compound represented by formula: Li-AM (in the formula, "AM" represents a substituted amino group represented by formula (I) or a cyclic amino group represented by formula (II) shown below) as the aforementioned lithium amide compound makes it possible to obtain the low Tg diene polymer (A) having at least one nitrogen-containing functional group introduced thereto, the at least one nitrogen-containing functional group being selected from the group consisting of a substituted amino group represented by the formula (I) and a cyclic amino group represented by the formula (II).

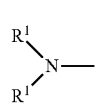
(I)

(In formula (I), $R^1$s each independently represent $C_{1-12}$ alkyl group, cycloalkyl group or aralkyl group.)

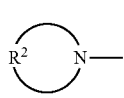
(II)

(In formula (II), $R^2$ represents alkylene, substituted alkylene, oxyalkylene or N-alkylamino-alkylene group having a $C_{3-16}$ methylene group.)

In the formula (I), $R^1$s each independently represent $C_{1-12}$ alkyl group, cycloalkyl group or aralkyl group. Specifically, preferable examples of $R^1$ include methyl, ethyl, butyl, octyl, cyclohexyl, 3-phenyl-1-propyl, isobutyl group, and the like. $R^1$s may be of either the same type or different types, respectively.

Further, in the formula (II), $R^2$ represents alkylene, substituted alkylene, oxyalkylene or N-alkylamino-alkylene group having a $C_{3-16}$ methylene group. The substituted alkylene group may be any of mono- to octa-substituted alkylene groups and examples of the substitute group thereof include $C_{1-12}$ linear or branched alkyl, cycloalkyl, bicycloalkyl, aryl, and aralkyl groups. Specific examples of $R^2$ include trimethylene, tetramethylene, hexamethylene, oxydiethylene, N-alkylazadiethylene, dodecamethylene, hexadecamethylene groups, and the like.

The aforementioned lithium amide compound may be either preliminary prepared from a secondary amine and a lithium compound and then used in a polymerization reaction or generated in a polymerization system.

Examples of the secondary amine include dimethylamine, diethylamine, dibutylamine, dioctylamine, dicylohexylamine, diisobutylamine, and cyclic amines such as azacycloheptane (i.e, hexamethyleneimine), 2-(2-ethylhexyl)pyrrolidine, 3-(2-propyl)pyrrolidine, 3,5-bis(2-ethylhexyl)piperidine, 4-phenylpiperidine, 7-decyl-1-azacyclotridecane, 3,3-dimethyl-1-aza-cyclotetradecane, 4-dodecyl-1-aza-cyclooctane, 4-(2-phenylbutyl)-1-aza-cyclooctane, 3-ethyl-5-cyclohexyl-1-aza-cycloheptane, 4-hexyl-1-aza-cycloheptane, 9-isoamyl-1-aza-cycloheptadecane, 2-methyl-1-aza-cycloheptadece-9-en, 3-isobutyl-1-aza-cyclododecane, 2-methyl-7-tert-butyl-1-aza-cyclododecane, 5-nonyl-1-aza-cyclododecane, 8-(4'-methylphenyl)-5-pentyl-3-aza-bicyclo[5.4.0]undecane, 1-butyl-6-aza-bicyclo[3.2.1]octane, 8-ethyl-3-aza-bicyclo[3.2.1]octane, 1-propyl-3-aza-bicyclo[3.2.2]nonane, 3-(tert-butyl)-7-aza-bicyclo[4.3.0]nonane, 1,5,5-trimethyl-3-aza-bicyclo[4.4.0]decane, and the like.

Examples of the lithium compound include hydrocarbyllithium such as ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenyl-butyllithium, cyclohexyllithium, cyclopentyllithium, a product obtained by a reaction of diisopropenyl benzene and butyllithium, and the like.

When an active terminal of the aforementioned (co) polymer having an active terminal is modified by a modification agent, a modification agent containing at least one of tin atom and nitrogen atom can be used as the modification agent.

The modification agent containing tin atom (i.e. a tin-containing compound) is preferably a tin-containing coupling agent represented by formula (III) shown below.

(III)

(In formula (III), $R^3$s is each independently selected from the group consisting of $C_{1-20}$ alkyl group, $C_{3-20}$ cycloalkyl group, $C_{6-20}$ aryl group, and $C_{7-20}$ aralkyl group; Xs each independently represent chlorine or bromine; and "a" is in the range of 0 to 3, "b" is in the range of 1 to 4, and a+b=4.)

The diene polymer (A) modified by the tin-containing coupling agent of the formula (III) has at least one type of tin-carbon bond.

Specific examples of $R^3$ include methyl, ethyl, n-butyl, neophyl, cyclohexyl, n-octyl, 2-ethylhexyl, and the like. The coupling agent represented by the formula (III) is preferably tin tetrachloride, $R^3SnCl_3$, $R^3_2SnCl_2$, $R^3_3SnCl$, and the like and most preferably tin tetrachloride.

The modification agent containing nitrogen atom (i.e. a nitrogen-containing compound) is preferably a nitrogen-containing compound having substituted/unsubstituted amino group, amide group, imino group, imidazole group, nitril group, pyridyl group, or the like. Specific examples of the nitrogen-containing compound include N,N'-dimethyl-imidazolidinone (i.e. 1,3-dimethyl-2-imidazolidinone), N-methylpyrrolidone, 4-dimethylaminobenzilidene aniline, 4,4'-bis(N,N-dimethylamino)benzophenone, 4,4'-bis(N,N-diethylamino)benzophenone, 4-(N,N-dimethylamino)benzophenone, 4-(N,N-diethylamino)benzophenone, [4-(N,N-dimethylamino)phenyl]methylethylketone, 4,4'-bis(1-hexamethyleneiminomethyl)benzophenone, 4,4'-bis(1-pyrrolidinomethyl)benzophenone, 4-(1-hexamethyleneiminomethyl)benzophenone, 4-(1- pyrrolidinomethyl)benzophenone, [4-(1-hexamethyleneimino)phenyl]methylethylketone, 3-[N,N-methyl(trimethylsilyl)amino]propyldimethylethoxysilane, and the like.

The diene polymer (A) preferably has a butadiene skeleton. When the low Tg diene polymer (A) has a butadiene skeleton, the rubber composition is made relatively soft, thereby increasing a ground-contact area and improving on-ice performance of a tire when the rubber composition is used in a tread of the tire. Examples of the diene polymer having a butadiene skeleton include polybutadiene rubber (BR), styrene-butadiene copolymer rubber (SBR), and the like. It is particularly preferable that the low Tg diene polymer (A) is polybutadiene (BR) in terms of the on-ice performance of the tire.

Content of the aforementioned diene polymer (A) is preferably ≥45% by mass, more preferably ≥50% by mass, and preferably ≤75% by mass, more preferably ≤70% by mass, and further more preferably ≤65% by mass, with respect to the total mass of the diene polymers. Setting the content of the diene polymer (A) to be within the aforementioned ranges successfully improves both on-ice performance and wear resistance of a tire in a satisfactory manner.

The diene polymer (B) (which diene polymer (B) will occasionally be referred to as the "high Tg diene polymer (B)" hereinafter) preferably has an isoprene skeleton. When the high Tg diene polymer (B) has an isoprene skeleton, reinforcing properties of the rubber composition and wear resistance of a tire further improve. Examples of the diene polymer having an isoprene skeleton include natural rubber (NR), synthetic polyisoprene rubber (IR), styrene-isoprene copolymer rubber (SIR), and the like. It is particularly preferable that the high Tg diene polymer (B) is natural rubber (NR) in terms of wear resistance.

Content of the aforementioned diene polymer (B) is preferably ≥25 mass %, more preferably ≥30 mass %, most preferably ≥35 mass %, and preferably ≤55 mass %, more preferably ≤50 mass %, with respect to the total mass of the diene polymers. Setting the content of the diene polymer (B) within the aforementioned ranges successfully improves both on-ice performance and wear resistance of a tire in a satisfactory manner.

The rubber composition of the present disclosure may further contain, in addition to the diene polymer (A) and the diene polymer (B) described above, another diene polymer (C). It is preferable that the another diene polymer (C) has glass transition temperature (Tg) between the glass transition temperature (Tg) of the low Tg diene polymer (A) and the glass transition temperature (Tg) of the high Tg diene polymer (B). Type of the another diene polymer (C) (which diene polymer (C) will occasionally be referred to as the "middle Tg diene polymer (C)" hereinafter) is selected in accordance with the types of the low Tg diene polymer (A) and the high Tg diene polymer (B). For example, in a case where the low Tg diene polymer (A) is polybutadiene rubber (BR) and the high Tg diene polymer (B) is natural rubber (NR) or synthetic polyisoprene rubber (IR), examples of the middle Tg diene polymer (C) include styrene-butadiene copolymer rubber (SBR), styrene-isoprene copolymer rubber (SIR), and the like.

It is preferable that the rubber composition of the present disclosure further contains a foaming agent. In a case where the rubber composition contains a foaming agent, when vulcanized rubber is produced by vulcanization of the rubber composition, gas bubbles derived from the foaming agent are generated inside the vulcanized rubber. Accordingly, it is possible, by manufacturing a tire by using in tread thereof the rubber composition containing a foaming agent, to further improve on-ice performance of the tire by a scratching effect and a drainage effect caused by the gas bubbles (-derived holes) in the tread.

Examples of the foaming agent include azodicarbonamide (ADCA), dinitrosopentamethylenetetramine (DNPT), dinitrosopentastyrenetetramine, benzenesulfonyl hydrazide derivative, p,p'-oxybisbenzenesulfonyl hydrazide (OBSH), ammonium bicarbonate, sodium bicarbonate, ammonium carbonate, nitrososulfonyl azo compound, N,N'-dimethyl-N, N'-dinitrosophthalamide, toluenesulfonyl hydrazide, p-toluenesulfonyl semicarbazide, p,p'-oxybisbenzenesulfonyl semicarbazide, and the like. Dinitrosopentamethylenetetramine (DNPT) is preferable among these foaming agents. These foaming agents may be used by either a single type solely or two or more types in combination.

Content of the foaming agent is not particularly restricted but preferably in the range of 0.1 to 30 parts by mass, more preferably in the range of 1 to 20 parts by mass, with respect to the total, i.e. 100 parts by mass, of the diene polymers.

It is preferable to use an auxiliary foaming agent such as urea, zinc stearate, zinc benzenesulfinate, zinc white, together with the aforementioned foaming agent. The aforementioned auxiliary foaming agents may be used by either a single type solely or two or more types in combination. Use of the auxiliary foaming agent together with the foaming agent facilitates a foaming reaction and enhances the degree of completion of the reaction, thereby successfully suppressing unwanted degradation which would otherwise occur over time.

Content of the auxiliary foaming agent is not particularly restricted but preferably in the range of 1 to 30 parts by mass with respect to the total, i.e. 100 parts by mass, of the diene polymers.

A foaming ratio of vulcanized rubber obtained by vulcanizing the rubber composition containing the aforementioned foaming agent is generally in the range of 1 to 50%, preferably in the range of 5 to 40%. In a case where the rubber composition contains a foaming agent, an excessively large foaming ratio results in a large volume of voids at a rubber surface, thereby making it difficult to ensure a satisfactorily large ground contact area of a tire. In this connection, setting a foaming ratio to be within the aforementioned range prevents an amount of gas bubbles from exceeding the adequate level, while successfully generating an enough amount of gas bubble-derived holes effectively functioning as drainage grooves, whereby deterioration in durability of a tire can be avoided. In the present disclosure, a "foaming ratio" of the vulcanized rubber represents the average foaming ratio Vs, which is specifically calculated by formula (2) shown below.

$$Vs = (\rho_0/\rho_1 - 1) \times 100 (\%) \qquad (2)$$

In the formula (2), $\rho_1$ represents density (g/cm$^3$) of vulcanized rubber (foamed rubber) and $\rho_0$ represents density (g/cm$^3$) of a solid phase portion of the vulcanized rubber (the foamed rubber). Density of vulcanized rubber and density of a solid phase portion of the vulcanized rubber are calculated from the mass of a sample measured in ethanol and the mass of the sample measured in ambient air. It is possible to change a foaming ratio in an appropriate manner by adjusting types, amounts or the like of the foaming agent and/or the auxiliary foaming agent.

The rubber composition of the present disclosure contains a resin. Examples of the resin include a $C_5$ resin, a $C_{5-9}$ resin, and the like. These resins may be used by either a single type solely or two or more types in combination.

It is particularly preferable that the rubber composition of the present disclosure contains a $C_5$ resin. Use of the rubber composition containing a $C_5$ resin in a tire further improves on-ice performance of the tire.

Examples of the $C_5$ resin include an aliphatic petroleum resin prepared by (co)polymerizing $C_5$ fraction obtained from thermal decomposition of naphtha in the petrochemical industry. Examples of the $C_5$ fraction generally include: olefinic hydrocarbons such as 1-pentene, 2-pentene, 2-methyl-1-butene, 2-methyl-2-butene, 3-methyl-1-butene; diolefinic hydrocarbons such as 2-methyl-1,3-butadiene, 1,2-pentadiene, 1,3-pentadiene, 3-methyl-1,2-butadiene; and the like. Commercially available products may be used as the $C_5$ resin.

Content of the $C_5$ resin is not particularly restricted but preferably in the range of 5 to 50 parts by mass, more preferably in the range of 13 to 43 parts by mass, further more preferably in the range of 15 to 25 parts by mass, with respect to the total, i.e. 100 parts by mass, of the diene polymers. The content of the $C_5$ resin of ≥5 parts by mass satisfactorily improves on-ice performance of a tire and the content of the $C_5$ resin of ≤50 parts by mass ensures satisfactorily high wear resistance of the tire.

Further, it is preferable that the rubber composition of the present disclosure contains a $C_{5-9}$ resin. Use of the rubber composition containing a $C_{5-9}$ resin in a tire further improves on-ice performance of the tire.

The aforementioned $C_{5-9}$ resin represents a $C_{5-9}$ synthetic petroleum resin. Examples of the $C_{5-9}$ resin include solid polymer obtained by polymerizing $C_{5-11}$ fraction derived from petroleum by using a Friedel-Crafts catalyst such as $AlCl_3$, $BF_3$, or the like. Specific examples of the solid polymer include copolymers containing as main components styrene, viniyltoluene, α-methylstyrene, indene, and the like. Provided that a "$C_{9+}$ component" represents a resin component having at least nine carbon atoms therein, a resin containing a $C_{9+}$ component by a relatively small content is preferable as the $C_{5-9}$ resin in terms of compatibility with the diene polymers. In the present disclosure, "a resin containing a $C_{9+}$ component by a relatively small content" means that the content of a $C_{9+}$ component in the total mass of the resin is ≤50 mass %, preferably ≤40 mass %. A commercially available product can be used as the $C_{5-9}$ resin and examples thereof include product name "Quintone® G100B" (manufactured by Zeon Corporation), product name "ECR213" (manufactured by Exxonmobile Chemical Company, Inc.), and the like.

Content of the $C_{5-9}$ resin is not particularly restricted but preferably in the range of 13 to 43 parts by mass with respect to the total, i.e. 100 parts by mass, of the diene polymers. The content of the $C_{5-9}$ resin of ≥13 parts by mass satisfactorily improves on-ice performance of a tire and the content of the $C_{5-9}$ resin of ≤43 parts by mass ensures satisfactorily high wear resistance of the tire.

In the rubber composition of the present disclosure, a mass ratio of content (parts by mass) of the silica with respect to content (parts by mass) of the resin, i.e. (silica content/resin content), is in the range of 1.00 to 4.00, preferably in the range of 1.00 to 2.95. Setting a mass ratio of (the silica content/the resin content) to be in the range of 1.00 to 4.00 further improves on-ice performance and wear resistance of a tire when the rubber composition is used in a tread of the tire. Setting a mass ratio of the silica content/the resin content to be in the range of 1.00 to 2.95 even further improves on-ice performance and wear resistance of a tire when the rubber composition is used in a tread of the tire. Setting a mass ratio of the silica content/the resin content to be ≤2.95 prevents elastic modulus of the rubber composition at low temperature from being too high and tan δ of the rubber composition at low temperature from being too low, thereby even further improving on-ice performance of a tire when the rubber composition is used in a tread of the tire.

The aforementioned mass ratio of the silica content/the resin content is more preferably ≤2.30, further more preferably ≤1.70, and more preferably ≥1.20, further more preferably ≥1.50. On-ice performance and wear resistance of a tire can be optimized by setting the mass ratio of the silica content/the resin content to be within these ranges.

Further, in the rubber composition of the present disclosure, a mass ratio of content (parts by mass) of the diene polymer (A) having a modified terminal with respect to content (parts by mass) of the resin, i.e. (content of the diene polymer (A) having a modified terminal/resin content), is preferably in the range of 1.2 to 7.5. Setting a mass ratio of (the content of the diene polymer (A) having a modified terminal/the resin content) to be in the range of 1.2 to 7.5 further improves on-ice performance and wear resistance of a tire when the rubber composition is used in a tread of the tire. Setting a mass ratio of the content of the diene polymer (A) having a modified terminal/the resin content to be ≥1.2 prevents elastic modulus of the rubber composition from being too low, thereby further improving wear resistance of a tire when the rubber composition is used in a tread of the tire.

The aforementioned mass ratio of the content (parts by mass) of the diene polymer (A)/the resin content (parts by mass) is more preferably ≤6.0, further more preferably ≤4.5, and more preferably ≥2.0. On-ice performance and wear resistance of a tire can be optimized by setting the mass ratio of the content of the diene polymer (A)/the resin content to be within these ranges.

Yet further, in the rubber composition of the present disclosure, a ratio of content (parts by mass) of the resin with respect to a foaming ratio (%) of the rubber composition, i.e. [resin content (parts by mass)/foaming ratio (%) of the rubber composition], is preferably in the range of 0.4 to 4.0, more preferably in the range of 0.4 to 3.5, further more preferably in the range of 0.4 to 0.9. Setting a ratio of the resin content/the foaming ratio of the rubber composition to be within the aforementioned ranges further improves on-ice performance and wear resistance of a tire when the rubber composition is used in a tread of the tire.

Yet further, it is preferable that the rubber composition of the present disclosure further contains hydrophilic short fibers. In a case where the rubber composition contains the hydrophilic short fibers and the aforementioned foaming agent in particular, gas generated by the foaming agent in the vulcanization process enters the (hollow) inside of each hydrophilic fiber and forms a gas bubble having a configuration corresponding to the configuration of the hydrophilic fiber. Wall surfaces of the gas bubble(-derived holes) are covered with a resin derived from the hydrophilic short fiber and thus made hydrophilic in this case. Accordingly, in a case where a tire is manufactured by using in tread thereof the rubber composition containing the hydrophilic short fibers and the foaming agent, wall surfaces of gas bubble-derived holes are exposed at the tread surface when the tire is used, which exposure improves an affinity for water and facilitates introduction of water to the gas bubbles-derived holes, thereby imparting the tire with good drainage properties to significantly improve on-ice performance of the tire.

Examples of the hydrophilic resin which can be used as a raw material of the hydrophilic short fibers include ethylene-vinyl alcohol copolymer, vinyl alcohol homopolymer, poly(meth)acrylic acid or ester thereof, polyethylene glycol, carboxyvinyl copolymer, styrene-maleic acid copolymer, polyvinylpyrrolidone, vinylpyrrolidone-vinylacetate copolymer, mercaptoethanol, and the like. Ethylene-vinyl alcohol copolymer, vinyl alcohol homopolymer and poly(meth) acrylic acid are preferable among these examples and ethylene-vinyl alcohol copolymer is particularly preferable.

Outer surface of the hydrophilic short fiber may have a coating layer formed of a low-melting point resin having an affinity for the diene polymer and preferably having low melting point lower than the vulcanization highest temperature of the rubber composition. Formation of such a coating layer as described above, having high affinity for the diene polymer, improves dispersibility of the short fibers into the diene polymer, while high affinity for water, of the inner surface of the hydrophilic short fiber, is effectively retained. Further, the low-melting point resin of the coating layer melts and is made fluid during the vulcanization process, thereby significantly contributing to better adhesion between the diene polymer and the hydrophilic short fiber, so that a tire imparted with good drainage properties and high durability can be easily realized. Thickness of the coating layer, which may vary depending on the content, the average diameter, and the like of the hydrophilic short fibers, is generally in the range of 0.001 to 10 μm and preferably in the range of 0.001 to 5 μm.

The melting point of the low-melting point resin for use in the coating layer is preferably lower than the highest temperature in vulcanization of the rubber composition. The vulcanization highest temperature represents the highest temperature reached by the rubber composition during the vulcanization process of the rubber composition. In a case where the rubber composition is vulcanized in a mold, for example, the vulcanization highest temperature represents the highest temperature reached by the rubber composition in a period, from the entry of the rubber composition into the mold, to the removal of the rubber composition from the mold for cooling. Such vulcanization highest temperature as described above can be measured by, for example, embedding a thermocouple in the rubber composition. The upper limit of the melting point of the low-melting point resin, although it is not particularly restricted, is preferably selected in view of the requirements and conditions described above. In general, the upper limit of the melting point of the low-melting point resin is lower than the vulcanization highest temperature of the rubber composition preferably by at least 10° C. and more preferably by at least 20° C. The industrial vulcanization temperature of a rubber composition is generally around 190° C. at its maximum. When the vulcanization highest temperature is set at e.g. aforementioned 190° C., the melting point of the low-melting point resin is generally set at temperature of ≤190° C., preferably ≤180° C., and more preferably ≤170° C.

A polyolefin resin is preferable as the low-melting point resin and examples of the polyolefin resin include polyethylene, polypropylene, polybutene, polystyrene, ethylene-propylene copolymer, ethylene-methacrylic acid copolymer, ethylene-ethyl acrylate copolymer, ethylene-propylene-diene terpolymer, ethylene-vinyl acetate copolymer, ionomer resins thereof, and the like.

The average length of the hydrophilic short fibers is preferably in the range of 0.1 to 50 mm, more preferably in the range of 1 to 7 mm, and the average diameter of the hydrophilic short fibers is preferably in the range of 1 μm to 2 mm, more preferably in the range of 5 μm to 0.5 mm. Setting the average length and the average diameter of the hydrophilic short fibers to be within the aforementioned ranges prevents the fibers from being entangled more than necessary, thereby ensuring satisfactory dispersion properties thereof.

Content of the hydrophilic short fibers is preferably in the range of 0.1 to 100 parts by mass, more preferably in the range of 1 to 50 parts by mass, further more preferably in the range of 1 to 10 parts by mass, with respect to the total, i.e. 100 parts by mass, of the diene polymers. Setting the content of the hydrophilic short fibers to be within the aforementioned ranges makes it possible to achieve satisfactory on-ice performance and satisfactory wear resistance of a tire in a well-balanced manner.

It is acceptable to optionally select compounding agents or additives generally for use in the rubber industries like silane coupling agent, softening agent (e.g. process oil), stearic acid, anti-oxidant, wax, zinc oxide (zinc white), vulcanization accelerator, vulcanizing agent, and the like and add them to the aforementioned diene polymer, silica, carbon black, foaming agent, auxiliary foaming agent, resin such as $C_5$ resin, $C_{5-9}$ resin or the like, and hydrophilic short fibers described above, in the rubber composition of the present disclosure unless addition of the optional additives adversely affects the object of the present disclosure. Commercially available products can be suitably used as the optional additives described above. The rubber composition of the present disclosure can be manufactured by blending the diene polymers with the respective additives optionally selected according to necessity and then subjecting the blend to mixing and kneading, warming, extrusion, and the like, although the manufacturing processes are not particularly restricted thereto.

Storage elastic modulus (E') of the rubber composition at −20° C. and loss tangent (tan δ) of the rubber composition at −20° C. can be changed by adjusting: types and/or blending ratios of the aforementioned diene polymers; and/or types and/or blending contents of the additives.

<Tire>

A tire of the present disclosure is characterized in that it uses the rubber composition described above. The rubber composition is preferably used in tread of the tire. A tire using the aforementioned rubber composition in tread thereof is excellent in both on-ice performance and wear resistance and useful for a winter tire such as a studless tire.

The tire of the present disclosure may be manufactured, depending on type and/or members of the tire, by either i) molding the rubber composition in an unvulcanized state and subjecting a resulting green tire to vulcanization or ii) subjecting the rubber composition to a preliminary vulcanization process, molding half-vulcanized rubber thus obtained by the preliminary vulcanization process, and subjecting a resulting tire to a main vulcanization process. Examples of gas with which the is to be inflated include inert gas such as nitrogen, argon, helium or the like, as well as ambient air and air of which partial pressure has been adjusted.

Examples

The present disclosure will be described further in detail by Examples hereinafter. The present disclosure is not limited by any means to these Examples.

<Preparation of Rubber Composition>

Rubber composition samples were prepared according to the blending prescriptions shown in Tables 1 to 3 by carrying out a first mixing process and a final mixing process in this order using a conventional Banbury mixer. In this regard, the mixture was once taken out from the Banbury mixer after completion of the first mixing process and then charged into the Banbury mixer again, to carry out the final mixing process. The highest temperature of the mixture in the first mixing process was set at 170° C. and the highest temperature of the rubber composition in the final mixing process was set at 110° C.

The samples were observed by using a scanning probe microscope according to the method described in paragraph [0012] of the present disclosure. A phase-separated structure and formation of a plurality of polymer phases immiscible with each other were confirmed in each of the rubber composition samples.

Further, storage elastic modulus (E') at −20° C., loss tangent (tan δ) at −20° C. and loss tangent (tan δ) at 50° C. were measured for each of the rubber composition samples thus obtained, according to the method described below. The results are shown in Tables 1 to 3.

(1) Storage elastic modulus (E') and loss tangent (tan δ)

Storage elastic modulus (E') at −20° C., loss tangent (tan δ) at −20° C. and loss tangent (tan δ) at 50° C. were measured for each of vulcanized rubber samples obtained by subjecting the rubber composition samples to vulcanization for 33 minutes at 145° C., by using a spectrometer manufactured by Ueshima Seisakusho Co., Ltd. under the conditions of initial strain: 2%, dynamic strain: 1%, and frequency: 52 Hz.

<Preparation of Tire>

Sample tires (tire size: 195/65R15) for testing were prepared by using in treads thereof the rubber composition samples thus obtained, according to the conventional method. A foaming ratio of the tread was calculated for each of the sample tires according to the formula (2) described above. On-ice performance, wear resistance and fuel consumption property were then evaluated for each of the sample tires by the methods described below. The results are shown in Tables 1 to 3.

(2) On-Ice Performance

On-ice performance of each of the sample tires was evaluated by: mounting the sample tire (×4) on each of four wheels of a Japanese vehicle having displacement volume around 1600 cc; measuring a braking distance at ice temperature −1° C. as on-ice braking performance of the sample tire; and expressing "on-ice performance" of the sample tire, as an index value, according to a formula: On-ice performance=(On-ice braking distance of Comparative Example 6/On-ice braking distance of the sample tire)×100. Comparative Example 6 was the control. The larger index value represents the better on-ice performance.

(3) Wear Resistance

Wear resistance of each of the sample tires was evaluated by: driving 10,000 km an actual vehicle mounted with the sample tire on a paved road; measuring remaining depths of grooves; calculating a running distance required for the tread to be worn by 1 mm and converting the running distance to an index value relative to "100" as the corresponding running distance of Comparative Example 6, for comparison. The larger index value represents the better wear resistance.

(4) Fuel Consumption Property

Fuel consumption property of each of the sample tires was evaluated by mounting the tire on an actual vehicle for use in the test; measuring a fuel consumption performance value in an environment at 25° C. to 30° C. (i.e. at normal temperature); and converting the fuel consumption performance value thus measured to an index value relative to "100" as the fuel consumption performance value of Comparative Example 6, for comparison. The larger index value represents the better fuel consumption performance (i.e. the better low fuel consumption property).

TABLE 1

|  |  |  |  | Example 1 | Example 2 | Example 3 | Example 4 | Comp. Ex. 1 | Example 5 | Example 6 |
|---|---|---|---|---|---|---|---|---|---|---|
| Blending prescription | First mixing process | Polybutadiene rubber *1 | Parts by mass | 0 | 0 | 0 | 0 | 0 | 0 | 0 |
|  |  | Modified polybutadiene rubber 1 *2 |  | 50 | 50 | 45 | 45 | 40 | 50 | 50 |
|  |  | Modified polybutadiene rubber 2 *3 |  | 0 | 0 | 0 | 0 | 0 | 0 | 0 |
|  |  | Natural rubber *4 |  | 50 | 50 | 55 | 55 | 60 | 50 | 50 |
|  |  | Carbon black *5 |  | 30 | 30 | 30 | 30 | 30 | 30 | 30 |
|  |  | Silica 1 *6 |  | 0 | 0 | 0 | 0 | 0 | 0 | 0 |
|  |  | Silica 2 *7 |  | 30 | 35 | 35 | 35 | 35 | 30 | 30 |
|  |  | Silica 3 *8 |  | 0 | 0 | 0 | 0 | 0 | 0 | 0 |
|  |  | Silane coupling agent *9 |  | 5 | 5 | 5 | 5 | 5 | 5 | 5 |
|  |  | Process oil *10 |  | 15 | 15 | 15 | 15 | 15 | 15 | 15 |
|  |  | Stearic acid |  | 2 | 2 | 2 | 2 | 2 | 2 | 2 |
|  |  | Zinc white |  | 2 | 2 | 2 | 2 | 2 | 2 | 2 |
|  |  | Anti-oxidant IPPD *11 |  | 2 | 2 | 2 | 2 | 2 | 2 | 2 |
|  |  | Resin 1 *12 |  | 18 | 12 | 15 | 30 | 15 | 10 | 25 |
|  |  | Resin 2 *13 |  | 0 | 0 | 0 | 0 | 0 | 0 | 0 |
|  |  | Hydrophilic short fibers *14 |  | 2 | 2 | 2 | 2 | 2 | 2 | 2 |
|  | Final mixing process | Sulfur |  | 2 | 2 | 2 | 2 | 2 | 2 | 2 |
|  |  | Vulcanization accelerator 1 *15 |  | 1 | 1 | 1 | 1 | 1 | 1 | 1 |
|  |  | Vulcanization accelerator 2 *16 |  | 1 | 1 | 1 | 1 | 1 | 1 | 1 |
|  |  | Foaming agent *17 |  | 4 | 4 | 4 | 4 | 4 | 4 | 4 |
| Silica content/resin content |  |  | Mass ratio | 1.7 | 2.9 | 2.3 | 1.2 | 2.3 | 3.0 | 1.2 |
| Content of modified polybutadiene rubber/resin content |  |  | Mass ratio | 2.8 | 4.2 | 3.0 | 1.5 | 2.7 | 5.0 | 2.0 |
| Physical properties | Foaming ratio |  | % | 20 | 20 | 20 | 20 | 20 | 20 | 20 |
|  | E' at −20° C. |  | MPa | 8.5 | 8 | 8.5 | 10 | 11 | 10 | 10 |
|  | tan δ at −20° C. |  | — | 0.50 | 0.47 | 0.49 | 0.52 | 0.46 | 0.46 | 0.55 |
|  | tan δ at 50° C. |  | — | 0.13 | 0.12 | 0.14 | 0.15 | 0.14 | 0.12 | 0.15 |
|  | $0.02 \times (E'_{-20°C.}) + 0.25$ |  | — | 0.42 | 0.41 | 0.42 | 0.45 | 0.47 | 0.45 | 0.45 |
|  | resin content/foaming ratio of rubber composition |  | Ratio | 0.9 | 0.6 | 0.75 | 1.5 | 0.75 | 0.5 | 1.25 |
| Evaluation | On-ice performance |  | Index | 125 | 117 | 120 | 128 | 90 | 110 | 120 |
|  | Wear resistance |  | Index | 102 | 105 | 104 | 101 | 102 | 101 | 100 |

TABLE 1-continued

| | | | | | Example 7 | Example 8 | Comp. Ex. 2 | Example 9 | Comp. Ex. 3 | Example 10 | Example 11 |
|---|---|---|---|---|---|---|---|---|---|---|---|
| | | Fuel consumption property | Index | | 102 | 104 | 102 | 100 | 101 | 102 | 100 |
| Blending prescription | First mixing process | Polybutadiene rubber *1 | Parts by mass | | 0 | 0 | 0 | 0 | 0 | 0 | 0 |
| | | Modified polybutadiene rubber 1 *2 | | | 50 | 70 | 40 | 50 | 40 | 60 | 50 |
| | | Modified polybutadiene rubber 2 *3 | | | 0 | 0 | 0 | 0 | 0 | 0 | 0 |
| | | Natural rubber *4 | | | 50 | 30 | 60 | 50 | 60 | 40 | 50 |
| | | Carbon black *5 | | | 25 | 35 | 40 | 30 | 40 | 40 | 30 |
| | | Silica 1 *6 | | | 0 | 0 | 0 | 0 | 0 | 0 | 0 |
| | | Silica 2 *7 | | | 35 | 25 | 40 | 30 | 40 | 20 | 30 |
| | | Silica 3 *8 | | | 0 | 0 | 0 | 0 | 0 | 0 | 0 |
| | | Silane coupling agent *9 | | | 5 | 5 | 5 | 5 | 5 | 5 | 5 |
| | | Process oil *10 | | | 15 | 15 | 15 | 15 | 15 | 15 | 15 |
| | | Stearic acid | | | 2 | 2 | 2 | 2 | 2 | 2 | 2 |
| | | Zinc white | | | 2 | 2 | 2 | 2 | 2 | 2 | 2 |
| | | Anti-oxidant IPPD *11 | | | 2 | 2 | 2 | 2 | 2 | 2 | 2 |
| | | Resin 1 *12 | | | 15 | 9 | 15 | 18 | 15 | 8 | 15 |
| | | Resin 2 *13 | | | 0 | 0 | 0 | 0 | 0 | 0 | 0 |
| | | Hydrophilic short fibers *14 | | | 2 | 2 | 0 | 2 | 0 | 2 | 2 |
| | Final mixing process | Sulfur | | | 2 | 2 | 2 | 2 | 2 | 2 | 2 |
| | | Vulcanization accelerator 1 *15 | | | 1 | 1 | 1 | 1 | 1 | 1 | 1 |
| | | Vulcanization accelerator 2 *16 | | | 1 | 1 | 1 | 1 | 1 | 1 | 1 |
| | | Foaming agent *17 | | | 4 | 4 | 0 | 0 | 4 | 4 | 4 |
| Silica content/resin content | | | Mass ratio | | 2.3 | 2.8 | 2.7 | 1.7 | 2.7 | 2.5 | 2.0 |
| Content of modified polybutadiene rubber/resin content | | | Mass ratio | | 3.3 | 7.8 | 2.7 | 2.8 | 2.7 | 7.5 | 3.3 |
| Physical properties | Foaming ratio | | % | | 20 | 20 | 0 | 0 | 20 | 20 | 20 |
| | $E'$ at $-20°$ C. | | MPa | | 8 | 9 | 24 | 9 | 12 | 10 | 8 |
| | tanδ at $-20°$ C. | | — | | 0.48 | 0.46 | 0.48 | 0.50 | 0.50 | 0.47 | 0.48 |
| | tanδ at $50°$ C. | | — | | 0.12 | 0.10 | 0.15 | 0.15 | 0.15 | 0.14 | 0.12 |
| | $0.02 \times (E'_{-20°C.}) + 0.25$ | | — | | 0.41 | 0.43 | 0.73 | 0.43 | 0.49 | 0.45 | 0.41 |
| | resin content/foaming ratio of rubber composition | | Ratio | | 0.75 | 0.45 | — | — | 0.75 | 0.4 | 0.75 |
| Evaluation | On-ice performance | | Index | | 119 | 110 | 80 | 115 | 98 | 105 | 123 |
| | Wear resistance | | Index | | 101 | 100 | 110 | 110 | 102 | 101 | 102 |
| | Fuel consumption property | | Index | | 104 | 106 | 100 | 100 | 100 | 102 | 103 |

TABLE 2

| | | | | Example 12 | Example 13 | Example 14 | Example 15 | Example 16 | Example 17 |
|---|---|---|---|---|---|---|---|---|---|
| Blending prescription | First mixing process | Polybutadiene rubber *1 | Parts by mass | 0 | 0 | 0 | 0 | 0 | 0 |
| | | Modified polybutadiene rubber 1 *2 | | 50 | 50 | 50 | 50 | 50 | 50 |
| | | Modified polybutadiene rubber 2 *3 | | 0 | 0 | 0 | 0 | 0 | 0 |
| | | Natural rubber *4 | | 50 | 50 | 50 | 50 | 50 | 50 |
| | | Carbon black *5 | | 15 | 45 | 30 | 30 | 30 | 30 |
| | | Silica 1 *6 | | 0 | 0 | 0 | 0 | 0 | 30 |
| | | Silica 2 *7 | | 45 | 15 | 30 | 30 | 30 | 0 |
| | | Silica 3 *8 | | 0 | 0 | 0 | 0 | 0 | 0 |
| | | Silane coupling agent *9 | | 5 | 5 | 5 | 5 | 5 | 5 |
| | | Process oil *10 | | 15 | 15 | 15 | 15 | 15 | 15 |
| | | Stearic acid | | 2 | 2 | 2 | 2 | 2 | 2 |
| | | Zinc white | | 2 | 2 | 2 | 2 | 2 | 2 |
| | | Anti-oxidant IPPD *11 | | 2 | 2 | 2 | 2 | 2 | 2 |
| | | Resin 1 *12 | | 15 | 15 | 15 | 15 | 0 | 15 |
| | | Resin 2 *13 | | 0 | 0 | 0 | 0 | 15 | 0 |
| | | Hydrophilic short fibers *14 | | 2 | 2 | 0 | 4 | 2 | 2 |
| | Final mixing process | Sulfur | | 2 | 2 | 2 | 2 | 2 | 2 |
| | | Vulcanization accelerator 1 *15 | | 1 | 1 | 1 | 1 | 1 | 1 |
| | | Vulcanization accelerator 2 *16 | | 1 | 1 | 1 | 1 | 1 | 1 |
| | | Foaming agent *17 | | 4 | 4 | 4 | 4 | 4 | 4 |
| Silica content/resin content | | | Mass ratio | 3.0 | 1.0 | 2.0 | 2.0 | 2.0 | 2.0 |
| Content of modified polybutadiene rubber/resin content | | | Mass ratio | 3.3 | 3.3 | 3.3 | 3.3 | 3.3 | 3.3 |
| Physical Properties | Foaming ratio | | % | 20 | 20 | 20 | 20 | 20 | 20 |
| | $E'$ at $-20°$ C. | | MPa | 9 | 8.5 | 8 | 8 | 10 | 7.5 |
| | tanδ at $-20°$ C. | | — | 0.46 | 0.46 | 0.48 | 0.48 | 0.50 | 0.46 |
| | tanδ at $50°$ C. | | — | 0.13 | 0.13 | 0.12 | 0.12 | 0.15 | 0.12 |
| | $0.02 \times (E'_{-20°C.}) + 0.25$ | | — | 0.43 | 0.42 | 0.41 | 0.41 | 0.45 | 0.40 |

TABLE 2-continued

| | | | | | | | | |
|---|---|---|---|---|---|---|---|---|
| resin content/foaming ratio of rubber composition | | Ratio | 0.75 | 0.75 | 0.75 | 0.75 | 0.75 | 0.75 |
| Evaluation | On-ice performance | Index | 117 | 118 | 113 | 127 | 108 | 118 |
| | Wear resistance | Index | 100 | 101 | 102 | 102 | 107 | 107 |
| | Fuel consumption property | Index | 102 | 99 | 103 | 103 | 88 | 106 |

| | | | | Example 18 | Comp. Ex. 4 | Example 19 | Comp. Ex. 5 | Example 20 | Comp. Ex. 6 |
|---|---|---|---|---|---|---|---|---|---|
| Blending prescription | First mixing process | Polybutadiene rubber *1 | Parts by mass | 0 | 0 | 0 | 0 | 0 | 50 |
| | | Modified polybutadiene rubber 1 *2 | | 50 | 50 | 50 | 50 | 45 | 0 |
| | | Modified polybutadiene rubber 2 *3 | | 0 | 0 | 0 | 0 | 0 | 0 |
| | | Natural rubber *4 | | 50 | 50 | 50 | 50 | 55 | 50 |
| | | Carbon black *5 | | 30 | 50 | 30 | 30 | 30 | 30 |
| | | Silica 1 *6 | | 0 | 0 | 0 | 0 | 0 | 0 |
| | | Silica 2 *7 | | 0 | 40 | 50 | 35 | 35 | 30 |
| | | Silica 3 *8 | | 30 | 0 | 0 | 0 | 0 | 0 |
| | | Silane coupling agent *9 | | 5 | 5 | 5 | 5 | 5 | 5 |
| | | Process oil *10 | | 15 | 15 | 15 | 15 | 15 | 15 |
| | | Stearic acid | | 2 | 2 | 2 | 2 | 2 | 2 |
| | | Zinc white | | 2 | 2 | 2 | 2 | 2 | 2 |
| | | Anti-oxidant IPPD *11 | | 2 | 2 | 2 | 2 | 2 | 2 |
| | | Resin 1 *12 | | 15 | 15 | 17 | 5 | 35 | 10 |
| | | Resin 2 *13 | | 0 | 0 | 0 | 0 | 0 | 0 |
| | | Hydrophilic short fibers *14 | | 2 | 2 | 2 | 2 | 2 | 2 |
| | Final mixing process | Sulfur | | 2 | 2 | 2 | 2 | 2 | 2 |
| | | Vulcanization accelerator 1 *15 | | 1 | 1 | 1 | 1 | 1 | 1 |
| | | Vulcanization accelerator 2 *16 | | 1 | 1 | 1 | 1 | 1 | 1 |
| | | Foaming agent *17 | | 4 | 4 | 4 | 4 | 4 | 4 |
| Silica content/resin content | | | Mass ratio | 2.0 | 2.7 | 2.9 | 7.0 | 1.0 | 3.0 |
| Content of modified polybutadiene rubber/resin content | | | Mass ratio | 3.3 | 3.3 | 2.9 | 10.0 | 1.3 | 0.0 |
| Physical Properties | Foaming ratio | | % | 20 | 20 | 20 | 20 | 20 | 20 |
| | E' at −20° C. | | MPa | 8.5 | 12 | 10 | 8 | 10 | 20 |
| | tanδ at −20° C. | | — | 0.50 | 0.51 | 0.48 | 0.41 | 0.54 | 0.44 |
| | tanδ at 50° C. | | — | 0.14 | 0.16 | 0.12 | 0.11 | 0.16 | 0.15 |
| | $0.02 \times (E'_{-20°C.}) + 0.25$ | | — | 0.42 | 0.49 | 0.45 | 0.41 | 0.45 | 0.65 |
| resin content/foaming ratio of rubber composition | | | Ratio | 0.75 | 0.75 | 0.85 | 0.25 | 1.75 | 0.5 |
| Evaluation | On-ice performance | | Index | 113 | 86 | 118 | 88 | 109 | 100 |
| | Wear resistance | | Index | 112 | 115 | 112 | 102 | 107 | 100 |
| | Fuel consumption property | | Index | 103 | 78 | 103 | 104 | 102 | 100 |

TABLE 3

| | | | | Comp. Ex. 7 | Comp. Ex. 8 | Example 21 | Example 22 | Comp. Ex. 9 | Comp. Ex. 10 | Comp. Ex. 11 | Comp. Ex. 12 |
|---|---|---|---|---|---|---|---|---|---|---|---|
| Blending prescription | First mixing process | Polybutadiene rubber *1 | Parts by mass | 0 | 0 | 0 | 0 | 0 | 40 | 40 | 0 |
| | | Modified polybutadiene rubber 1 *2 | | 45 | 45 | 0 | 0 | 45 | 0 | 0 | 45 |
| | | Modified polybutadiene rubber 2 *3 | | 0 | 0 | 45 | 45 | 0 | 0 | 0 | 0 |
| | | Natural rubber *4 | | 55 | 55 | 55 | 55 | 55 | 60 | 60 | 55 |
| | | Carbon black *5 | | 15 | 15 | 15 | 25 | 15 | 60 | 60 | 15 |
| | | Silica 1 *6 | | 0 | 0 | 0 | 0 | 0 | 0 | 0 | 0 |
| | | Silica 2 *7 | | 45 | 25 | 25 | 35 | 30 | 0 | 0 | 30 |
| | | Silica 3 *8 | | 0 | 0 | 0 | 0 | 0 | 0 | 0 | 0 |
| | | Silane coupling agent *9 | | 5 | 5 | 5 | 5 | 5 | 0 | 0 | 5 |
| | | Process oil *10 | | 15 | 15 | 15 | 15 | 15 | 0 | 0 | 25 |
| | | Stearic acid | | 2 | 2 | 2 | 2 | 2 | 2 | 2 | 2 |
| | | Zinc white | | 2 | 2 | 2 | 2 | 2 | 1.5 | 1.5 | 2 |
| | | Anti-oxidant IPPD *11 | | 2 | 2 | 2 | 2 | 2 | 1 | 1 | 2 |
| | | Resin 1 *12 | | 10 | 35 | 25 | 25 | 35 | 5.7 | 20 | 30 |
| | | Resin 2 *13 | | 0 | 0 | 0 | 0 | 0 | 0 | 0 | 0 |
| | | Hydrophilic short fibers *14 | | 2 | 2 | 2 | 2 | 2 | 0 | 0 | 2 |
| | Final mixing process | Sulfur | | 2 | 2 | 2 | 2 | 2 | 2 | 2 | 2 |
| | | Vulcanization accelerator 1 *15 | | 1 | 1 | 1 | 1 | 1 | 1 | 1 | 1 |
| | | Vulcanization accelerator 2 *16 | | 1 | 1 | 1 | 1 | 1 | 1 | 1 | 1 |
| | | Foaming agent *17 | | 4 | 4 | 4 | 4 | 4 | 4 | 4 | 1.5 |
| Silica content/resin content | | | Mass ratio | 4.5 | 0.7 | 1.0 | 1.4 | 0.9 | 0.0 | 0.0 | 1.0 |
| Content of modified polybutadiene rubber/resin content | | | Mass ratio | 4.5 | 1.3 | 1.8 | 1.8 | 1.3 | 0.0 | 0.0 | 1.5 |
| Physical Properties | Foaming ratio | | % | 20 | 20 | 20 | 20 | 20 | 20 | 20 | 5 |
| | E' at −20° C. | | MPa | 10 | 9.5 | 8 | 9.5 | 4.5 | 11 | 15 | 12 |
| | tanδ at −20° C. | | — | 0.48 | 0.51 | 0.53 | 0.55 | 0.45 | 0.43 | 0.50 | 0.50 |
| | tanδ at 50° C. | | — | 0.17 | 0.16 | 0.12 | 0.14 | 0.12 | 0.13 | 0.16 | 0.16 |
| | $0.02 \times (E'_{-20°C.}) + 0.25$ | | — | 0.45 | 0.44 | 0.41 | 0.44 | 0.34 | 0.47 | 0.55 | 0.49 |

TABLE 3-continued

| | | | | | | | | | |
|---|---|---|---|---|---|---|---|---|---|
| resin content/foaming ratio of rubber composition | | | Ratio | 0.5 | 1.75 | 1.25 | 1.25 | 1.75 | 0.3 | 1.0 | 6 |
| Evaluation | On-ice performance | | Index | 93 | 103 | 111 | 112 | 95 | 90 | 82 | 88 |
| | Wear resistance | | Index | 110 | 90 | 108 | 111 | 90 | 112 | 110 | 114 |
| | Fuel consumption property | | Index | 103 | 95 | 105 | 102 | 102 | 98 | 95 | 102 |

| | | | | Example 23 | Example 24 | Example 25 | Comp. Ex. 13 | Comp. Ex. 14 | Comp. Ex. 15 | Example 26 |
|---|---|---|---|---|---|---|---|---|---|---|
| Blending prescription | First mixing process | Polybutadiene rubber *1 | Parts by mass | 0 | 0 | 0 | 0 | 0 | 0 | 0 |
| | | Modified polybutadiene rubber 1 *2 | | 45 | 45 | 45 | 50 | 50 | 50 | 50 |
| | | Modified polybutadiene rubber 2 *3 | | 0 | 0 | 0 | 0 | 0 | 0 | 0 |
| | | Natural rubber *4 | | 55 | 55 | 55 | 50 | 50 | 50 | 50 |
| | | Carbon black *5 | | 15 | 15 | 15 | 40 | 15 | 30 | 25 |
| | | Silica 1 *6 | | 0 | 0 | 0 | 0 | 0 | 0 | 0 |
| | | Silica 2 *7 | | 30 | 30 | 30 | 35 | 45 | 60 | 50 |
| | | Silica 3 *8 | | 0 | 0 | 0 | 0 | 0 | 0 | 0 |
| | | Silane coupling agent *9 | | 5 | 5 | 5 | 5 | 5 | 5 | 5 |
| | | Process oil *10 | | 25 | 25 | 25 | 15 | 15 | 15 | 15 |
| | | Stearic acid | | 2 | 2 | 2 | 2 | 2 | 2 | 2 |
| | | Zinc white | | 2 | 2 | 2 | 2 | 2 | 2 | 2 |
| | | Anti-oxidant IPPD *11 | | 2 | 2 | 2 | 2 | 2 | 2 | 2 |
| | | Resin 1 *12 | | 30 | 25 | 30 | 5 | 43 | 45 | 35 |
| | | Resin 2 *13 | | 0 | 0 | 0 | 0 | 0 | 0 | 0 |
| | | Hydrophilic short fibers *14 | | 2 | 2 | 2 | 2 | 2 | 2 | 2 |
| | Final mixing process | Sulfur | | 2 | 2 | 2 | 2 | 2 | 2 | 2 |
| | | Vulcanization accelerator 1 *15 | | 1 | 1 | 1 | 1 | 1 | 1 | 1 |
| | | Vulcanization accelerator 2 *16 | | 1 | 1 | 1 | 1 | 1 | 1 | 1 |
| | | Foaming agent *17 | | 2 | 4 | 4 | 4 | 4 | 4 | 4 |
| Silica content/resin content | | | Mass ratio | 1.0 | 1.2 | 1.0 | 7.0 | 1.0 | 1.3 | 1.4 |
| Content of modified polybutadiene rubber/resin content | | | Mass ratio | 1.5 | 1.8 | 1.5 | 10.0 | 1.2 | 1.1 | 1.4 |
| Physical Properties | Foaming ratio | | % | 10 | 20 | 20 | 20 | 20 | 20 | 20 |
| | E' at −20° C. | | MPa | 10 | 6 | 6 | 10 | 4.5 | 9 | 9 |
| | tanδ at −20° C. | | — | 0.50 | 0.42 | 0.50 | 0.43 | 0.55 | 0.70 | 0.57 |
| | tanδ at 50° C. | | — | 0.16 | 0.16 | 0.16 | 0.14 | 0.13 | 0.17 | 0.16 |
| | $0.02 \times (E'_{-20°C.}) + 0.25$ | | — | 0.45 | 0.37 | 0.37 | 0.45 | 0.34 | 0.43 | 0.43 |
| resin content/foaming ratio of rubber composition | | | Ratio | 3 | 1.25 | 1.5 | 0.25 | 2.15 | 2.25 | 1.75 |
| Evaluation | On-ice performance | | Index | 100 | 107 | 109 | 87 | 96 | 90 | 103 |
| | Wear resistance | | Index | 113 | 103 | 100 | 104 | 88 | 105 | 101 |
| | Fuel consumption property | | Index | 102 | 102 | 102 | 101 | 101 | 100 | 101 |

*1 Polybutadiene rubber: cis-1,4-polybutadiene rubber, product name "UBEPOL 150L" manufactured by Ube Industries, Ltd., Tg=−110° C.

*2 Modified polybutadiene rubber 1: modified polybutadiene rubber synthesized by the method described below, Tg=−110° C.

*3 Modified polybutadiene rubber 2: modified polybutadiene rubber synthesized by the method described below, Tg=−95° C.

*4 Natural rubber: Tg=−60° C.

*5 Carbon black: "N134" manufactured by Asahi Carbon Co., Ltd., nitrogen adsorption specific surface area (N$_2$SA)=146 m$^2$/g

*6 Silica 1: Product name "Nipsil EQ" manufactured by Tosoh Silica Corporation, CTAB specific surface area=100 m$^2$/g, nitrogen adsorption specific surface area (N$_2$SA)=100 m$^2$/g

*7 Silica 2: Product name "Nipsil AQ" manufactured by Tosoh Silica Corporation, CTAB specific surface area=150 m$^2$/g, nitrogen adsorption specific surface area (N$_2$SA)=200 m$^2$/g

*8 Silica 3: Product name "Nipsil HQ" manufactured by Tosoh Silica Corporation, CTAB specific surface area=200 m$^2$/g, nitrogen adsorption specific surface area (N$_2$SA)=250 m$^2$/g

*9 Silane coupling agent: "Si69" manufactured by Evonic Industries, AG

*10 Process oil: Naphthene-based process oil, product name "Diana Process Oil NS-24" manufactured by Idemitsu Kosan Co., Ltd., pour point=−30° C.

*11 Anti-oxidant IPPD: N-isopropyl-N'-phenyl-p-phenylenediamine

*12 Resin 1: C$_5$ resin, Product name "Escorez 1102" manufactured by Tonen Chemical Corporation

*13 Resin 2: resin other than C$_5$ resin, Product name "NEOPOLYMER" manufactured by Nippon Gosei Resin K. K.

*14 Hydrophilic short fiber: hydrophilic short fiber manufactured by the method described below

*15 Vulcanization accelerator 1: di-2-benzothiazolyl disulfide (MBTS)

*16 Vulcanization accelerator 2: N-cyclohexyl-2-benzothiazolylsulfenamide (CBS)

*17 Foaming agent: dinitrosopentamethylenetetramine (DNPT)

<Modified Polybutadiene Rubber 1>

(i) Preparation of Catalyst 7.11 g of cyclohexane solution of butadiene (15.2 mass %), 0.59 ml of cyclohexane solution of neodymium neodecanoate (0.56 M), 10.32 ml of toluene solution of methylalminoxane MAO ("PMAO" manufactured by Tosoh Akzo Corporation, 3.23 M as aluminum concentration), and 7.77 ml of hexane solution of diisobutylaluminum hydride (manufactured by KANTO CHEMICAL CO., INC., 0.90 M) were charged in this order into a dry, nitrogen-substituted 100 ml glass jar having a rubber-plugged opening. The mixture was matured for 2 minutes at room temperature and then 1.45 ml of hexane solution of diethylaluminum chloride (manufactured by KANTO CHEMICAL CO., INC., 0.95 M) was added thereto and matured for 15 minutes at room temperature with occasional stirring. Concentration of neodymium in a catalyst solution thus obtained was 0.011 M (mole/liter).

(ii) Production of Modified Diene Rubber Having a Modified Terminal

Dry cyclohexane and a cyclohexane solution of dried and purified butadiene were respectively charged into a dry, nitrogen-substituted 900 ml glass jar having a rubber-plugged opening, so that 400 g of cyclohexane solution of butadiene (12.5 mass %) was charged into the glass jar eventually. Next, 2.28 ml of the catalyst solution prepared as described above (0.025 mmol in terms of neodymium) was charged into the jar and polymerization was carried out for 1.0 hour in a hot water bath at 50° C.

(iii) Primary Modification Treatment 23.5 (mol equivalent with respect to neodymium) of 3-glycidoxypropyltrimethoxysilane in the form of hexane solution (1.0 M), as a primary modification agent, was charged into the jar and a primary modification treatment was carried out at 50° C. for 60 minutes.

(iv) Treatments after the Primary Modification Treatment

Next, 1.2 ml of sorbitan trioleic acid ester as a carboxylic acid ester of polyhydric alcohol was added by itself to the jar and a modification reaction was further carried out at 50° C. for 1 hour. Thereafter, 2 ml of 5% isopropanol solution of 2,2'-methylene-bis(4-ethyl-6-t-butylphenol) (NS-5) as an antioxidant was added to the reactant to stop the reaction and then the reactant was re-precipitated in isopropanol containing a small amount of NS-5. The precipitation was dried by using a drum, whereby polybutadiene rubber having a modified active terminal was obtained. Glass transition temperature of modified polybutadiene rubber 1 thus obtained was −110° C.

<Modified Polybutadiene Rubber 2>

283 g of cyclohexane, 50 g of 1,3-butadiene, 0.0057 mmol of 2,2-ditetrahydrofurylpropane, and 0.513 mmol of hexamethyleneimine were charged as cyclohexane solutions, respectively, into a dry, nitrogen-substituted pressure-resistant glass vessel having inner volume: 900 mL. 0.57 mmol of n-butyllithium (n-BuLi) was added to the mixture and then a polymerization reaction was carried out in a hot water bath (50° C.) equipped with a stirrer for 4.5 hours. The polymerization conversion ratio was substantially 100%.

Next, 0.100 mmol of tin tetrachloride was added in the form of cyclohexane solution to the polymerization system and the mixture was stirred for 30 minutes at 50° C. Thereafter, 0.5 mL of an isopropanol solution of 2,6-di-tert-butyl-p-cresol (BHT) (BHT concentration: 5 mass %) was added to the polymerization system to stop the polymerization reaction. The resulting substance was dried according to the conventional method, whereby modified polybutadiene rubber 2 was obtained. Glass transition temperature of modified polybutadiene rubber 2 thus obtained was −95° C.

<Hydrophilic Short Fiber>

Hydrophilic short fibers, having a polyethylene coating layer formed thereon, were manufactured according to the manufacturing example 3 disclosed in JP 2012-219245 A by: charging 40 parts by mass of polyethylene ["NOVATEC HJ360" (MFR: 5.5, melting point: 132° C.) manufactured by Japan Polyethylene Corporation] and 40 parts by mass of ethylene-vinyl alcohol copolymer ["EVAL F104B" (MFR: 4.4, melting point: 183° C.) manufactured by Kuraray Co., Ltd.] into hoppers of two twin screw extruders, respectively; simultaneously extruding polyethylene and ethylene-vinyl alcohol copolymer from outlet ports of the dies, respectively; and cutting the fiber thus obtained into 2 mm length pieces by a conventional method.

It is understood from the results of Examples shown in Tables 1 to 3 that use of the rubber composition according to the present disclosure can significantly improve both on-ice performance and wear resistance of a tire.

INDUSTRIAL APPLICABILITY

The rubber composition of the present disclosure can be applied to a tire and tread rubber of a studless tire in particular. The tire of the present disclosure is useful as a studless tire.

The invention claimed is:

1. A rubber composition comprising at least one type of diene polymer, silica, and a resin, wherein:
    the resin is a $C_5$ resin and/or a $C_{5-9}$ resin,
    5 MPa≤storage elastic modulus (E') of the rubber composition at 20° C.≤10 MPa;
    storage elastic modulus (E') at −20° C. and loss tangent (tan δ) at −20° C. of the rubber composition satisfy following formula (1):

$$0.02\times(E'_{-20°\ C.})+0.25\le(\tan\delta_{-20°\ C.})\le 0.65 \qquad (1)$$

(In the formula, ($E'_{-20°\ C.}$) represents storage elastic modulus (MPa) of the rubber composition at −20° C. and (tan $\delta_{-20°\ C.}$) represents loss tangent of the rubber composition at −20° C.); and
    a mass ratio of content (parts by mass) of the silica with respect to content (parts by mass) of the resin, or silica content/resin content, is in the range of 1.00 to 4.00.

2. The rubber composition of claim 1, wherein at least one of the diene polymers has a modified terminal group.

3. The rubber composition of claim 1, wherein the silica has a content of ≥20 parts by mass with respect to the total mass or 100 parts by mass of the diene polymers and the rubber composition further comprises carbon black by a content of ≥20 parts by mass with respect to the total mass or 100 parts by mass of the diene polymers.

4. The rubber composition of claim 3, wherein the total content of the silica and the carbon black is ≥60 parts by mass with respect to the total mass or 100 parts by mass of the diene polymers.

5. The rubber composition of claim 3, wherein the content of the silica is equal to or higher than the content of the carbon black.

6. The rubber composition of claim 1, wherein: the diene polymer includes at least two types of diene polymers forming a plurality of polymer phases which are immiscible with each other; and
    in the diene polymer having the highest content and the diene polymer having the second highest content, of the polymers, content of the diene polymer (A) having lower glass transition temperature (Tg) is ≥80 mass % of content of the diene polymer (B) having higher glass transition temperature (Tg).

7. The rubber composition of claim 6, wherein the diene polymer (A) has a modified terminal group.

8. The rubber composition of claim 7, wherein a mass ratio of content (parts by mass) of the diene polymer (A) having a modified terminal group with respect to content (parts by mass) of the resin, or content of the diene polymer (A) having a modified terminal group/content of the resin, is in the range of 1.2 to 7.5.

9. The rubber composition of claim 1, wherein a ratio of the resin content (parts by mass) with respect to a foaming ratio (%) of the rubber composition, or resin content (parts by mass)/foaming ratio (%) of the rubber composition, is in the range of 0.4 to 3.5.

10. The rubber composition of claim 1, wherein loss tangent (tan δ) at −20° C. of the rubber composition is ≥0.46 and ≤0.55.

11. The rubber composition of claim 6, wherein the diene polymer (A) has a butadiene skeleton.

12. The rubber composition of claim 11, wherein the diene polymer (A) is polybutadiene rubber.

13. The rubber composition of claim 6, wherein the diene polymer (B) has an isoprene skeleton.

14. The rubber composition of claim 13, wherein the diene polymer (B) is natural rubber.

15. The rubber composition of claim 7, wherein the diene polymer (A) has a terminal modified by a silane compound.

16. The rubber composition of claim 15, wherein the silane compound has a glycidoxy group.

17. The rubber composition of claim 1, further comprising a foaming agent.

18. The rubber composition of claim 1, which has gas bubble-derived holes formed therein.

19. The rubber composition of claim 1, which comprises a $C_5$ resin as the resin.

20. The rubber composition of claim 1, further comprising hydrophilic short fibers.

21. A tire, using the rubber composition of claim 1.

* * * * *